United States Patent [19]

Oksanen et al.

[11] Patent Number: 5,348,036

[45] Date of Patent: Sep. 20, 1994

[54] AUTOMATIC CONTROL VALVE

[75] Inventors: Kari J. Oksanen, Vancouver; Grant V. LaBar, Surrey, both of Canada

[73] Assignee: Singer Valve Inc., Surrey, Canada

[21] Appl. No.: 56,403

[22] Filed: May 4, 1993

[51] Int. Cl.⁵ .......................................... F16K 31/365
[52] U.S. Cl. .................................. 137/1; 137/489.5; 137/488; 137/489
[58] Field of Search ............ 137/488, 489, 492, 489.5, 137/1; 251/63.4

[56] References Cited

U.S. PATENT DOCUMENTS

| | | |
|---|---|---|
| 1,157,957 | 10/1915 | Pfau . |
| 1,199,567 | 9/1916 | Kellogg et al. . |
| 2,309,848 | 2/1943 | King ............................ 137/489.5 X |
| 2,329,323 | 9/1943 | Benz ............................ 62/1 |
| 2,487,089 | 11/1949 | Anthes ......................... 137/489.5 |
| 2,523,826 | 10/1944 | Heinzelman ................. 137/153 |
| 3,543,784 | 12/1970 | Smith ........................... 137/116 |
| 3,762,436 | 10/1973 | Clayton ........................ 137/505.35 |
| 3,930,518 | 1/1976 | Fuller et al. ................. 137/487 |
| 4,249,556 | 2/1981 | Waletzko ..................... 137/488 |
| 4,705,065 | 11/1987 | McNeely et al. ............. 137/488 X |
| 4,944,249 | 7/1990 | Takeuchi et al. ............. 137/489 X |

*Primary Examiner*—Martin P. Schwadron
*Assistant Examiner*—Kevin L. Lee
*Attorney, Agent, or Firm*—Bull, Housser & Tupper

[57] ABSTRACT

An automatic control valve has a main valve member moveable between open and closed positions thereof in response to pressure applied to a first piston or diaphragm in a first control chamber. The valve member moves to modulate flow through the valve to maintain desired flow conditions. Pilot pressure signals are generated to reflect the flow conditions, usually upstream and downstream from the valve, which signals are processed to generate a control signal which is fed to the first control chamber to control pressure therein. Normal movement of the valve produces wear which causes leakage of the diaphragm or seals oft he piston causing loss of primary control of the valve member which tends to fail "open". This causes an initial rise in flow through the valve which is detected by the pilot pressure signal but because of the leakage, is unable to correct. This prior art problem is avoided by providing a back-up piston or diaphragm which is maintained in an inactive position during normal operation of the valve by the first piston or diaphragm, and thus does not wear. When pilot pressure signals reflect primary control failure, the back-up piston or diaphragm moves to an active position and selectively cooperates with the main valve member to control flow conditions through the valve independently of the first control chamber.

20 Claims, 2 Drawing Sheets

AUTOMATIC CONTROL VALVE

BACKGROUND OF THE INVENTION

The invention relates to automatic liquid control valves to control liquid flows in many different types of applications, the present invention being particularly related to controlling liquid flows in water supplies and hydrocarbon pipelines.

Automatic control valves have many different applications, such as controlling pressure downstream from the valve, controlling levels in tanks or reservoirs either upstream or downstream from the valve, reducing undesirable effects of pressure surges in supplies due to actuating related valves or pumps, etc. The valves used in this wide range of applications are modulating or throttling valves which throttle flow through the valve to attain a desired pressure drop or flow condition across the valve. Throttling of flow is attained by positioning a main valve member with respect to a complementary valve seat to control size of clearance through the valve, if necessary by essentially continuously varying position of the valve member with respect to the seat. A liquid filled, variable volume control chamber is sealed with a movable partition means, for example a piston with a sliding resilient seal, or a flat or rolling flexible diaphragm, the partition means being coupled to the main valve member to position the valve member in response to pressure within the control chamber. Most of the valves used for these purposes are controlled automatically by use of a pilot pressure system, in which a pilot circuit senses pressures in the flow on an upstream and/or downstream side of the valve, or at some other convenient location depending on the application, for example at the base of a reservoir in which reservoir depth is to be controlled. The pilot system generates at least one type of pressure signal which is processed following conventional techniques and generates a control signal which is fed into the control chamber used to control position of the main valve member.

The sliding piston seals or the flat or rolling diaphragms used to isolate the control chamber from the main flow through the valve are subject to eventual failure due to movement and aging. Failure causes liquid loss from the control chamber, which usually causes the control valve itself to fail "open", that is, the main valve member moves to the full position, which causes flow through the valve to increase, with consequent problems arising upstream or downstream depending on the application of the valve. Because the sliding seals or diaphragm are contained within the valve itself and are not visible from the outside, inspection of the seals or diaphragm without dismantling the valve is usually impossible, and thus there is a tendency to replace the seals or diaphragm prematurely rather than risk failure in normal use. Also, the pilot control systems used to control the valves can fail, for example, due to blockage of a conduit with dirt, or failure of the pilot control valve to control properly, and thus in very critical areas preventative maintenance costs can be considerable.

Some valves are designed to fail "closed" and are termed "fail-safe" valves. While the failure of these valves can prevent damage in some applications, when they fail there is a complete cessation of flow through the valve, which in other applications can aggravate dangerous situations. Other valves use a parallel duplicate or redundant system in which both systems have some duplicating components which are operative simultaneously, and thus are both are subject to wear, usually at the same rate, and thus are likely to fail at approximately similar moments in time.

U.S. Pat. No. 1,199,567 in which the inventors are Kellogg and Crowell, and U.S. Pat. No. 3,762,436 in which the inventor is Clayton, both disclose liquid pressure regulating valves using diaphragms. U.S. Pat. No. 1,157,957, in which the inventor is Phau, also discloses a liquid pressure regulator to control in pressure in storage reservoirs. U.S. Pat. No. 3,930,518, in which the inventors are Fuller and Smith, discloses a valve which is responsive to a differential pressure switch to operate a valve closing system. U.S. Pat. No. 2,523,826, in which the inventor is Henzelman, discloses a back pressure regulator valve, and U.S. Pat. No. 2,329,323, in which the inventor Benz, discloses a ratio regulator for liquified gases and volatile liquids using a pair of diaphragms cooperating with a common shaft. While some of the patents above disclose valves which are for use in similar applications to the present invention, none of them shows a independent backup system which is normally inoperative and therefore not subject to wear, and is only brought into operation upon detection of critical or undesirable flow conditions and, when brought into operation, clearly maintains the desired flow condition.

SUMMARY OF THE INVENTION

The present invention provides a safety or back-up system for a primary system of a control valve which, when brought into use by failure of the primary system, does not merely close the valve so that the main flow completely ceases, but instead operates in a manner essentially similar to the primary system but under slightly different parameters. This permits normal continued operation of the valve until it is convenient to repair the failed diaphragm or piston seal, or in some instances, a failed pilot control system. Thus, not only are the dangers of premature valve failure eliminated, but the control valve continues to operate, and the operation can continue for some considerable time until it is convenient to repair the control valve. In many applications, it is convenient to provide a read-out signal which would indicate at a remote control station that the back-up stem has moved from an inactive condition to an active or operating condition, but that the control valve is still continuing in normal operation on the back-up system.

The back-up system is not in use during normal operation of the valve under the primary system, and thus it does not become subject to wear. Because there are very few moving parts, the back-up system is simple and economical to manufacture, and can be retro-fitted to existing valves. The back-up system is automatically ready for use when required upon failure of a critical component of the main valve, or the primary control system and does not require manual intervention to make it operative.

An automatic control valve according to the invention comprises a valve body, a main valve member, a first partition means, a second partition means, and a second partition coupling means. The valve body has an inlet port, an outlet port, and a valve seat disposed between the ports, the valve seat defining a valve opening to permit communication between the ports. The main valve member is moveable between a closed position against the seat to close the valve, and an open position spaced from the seat to control flow of liquid through the valve opening to maintain a desired flow condition through the valve. The first partition means is moveable between extended and retracted positions thereof to reflect the two positions of the main valve member. The first partition means cooperates with the valve body to define in part a variable volume first control chamber which is exposed to a first control pressure which reflects the liquid flow condition through the valve. The control pressure acts on the first partition means to move the first partition means which cooperates with the valve member so that the valve member moves in response to changes in the first control pressure to attempt to position the valve member to maintain the desired liquid flow condition through the valve. The second partition means is moveable between inactive and active positions thereof. The second partition means cooperates with the valve body to define in part a variable volume second control chamber which is exposed to a second control pressure which reflects an unacceptable deviation of liquid flow through the valve from the desired liquid flow condition. The second partition means is retained in the retracted position thereof when deviation of the liquid flow condition through the valve are acceptable. The second partition coupling means is for selectively coupling the second partition means with the valve member should the deviation of the flow conditions through the valve become unacceptable, which increases the second control pressure to become sufficiently high to position the valve member in response to the second control pressure.

A method of automatically controlling liquid flow through a valve according to the invention comprises the steps of:
- detecting an acceptable first flow condition through the valve and generating a first control signal to reflect an acceptable deviation from a desired flow condition through the valve,
- displacing a main valve member in response to the first control signal by varying pressure in a first control chamber, the main valve member being displaced by a first partition means with respect to a valve seat in a direction to attempt to maintain the desired flow condition,
- detecting an unacceptable second flow condition through the valve, and generating a second control signal to reflect an unacceptable deviation from the desired flow condition, and
- displacing the main valve member in response to the second control signal by varying pressure in a second control chamber, the main valve member being displaced by a second partition means with respect to the valve seat in a direction to attempt to maintain the desired flow condition.

A detailed disclosure following, related to drawings, describes a preferred apparatus and method according to the invention, which are capable of expression in apparatus and method other than those particularly described and illustrated.

Figure 1:
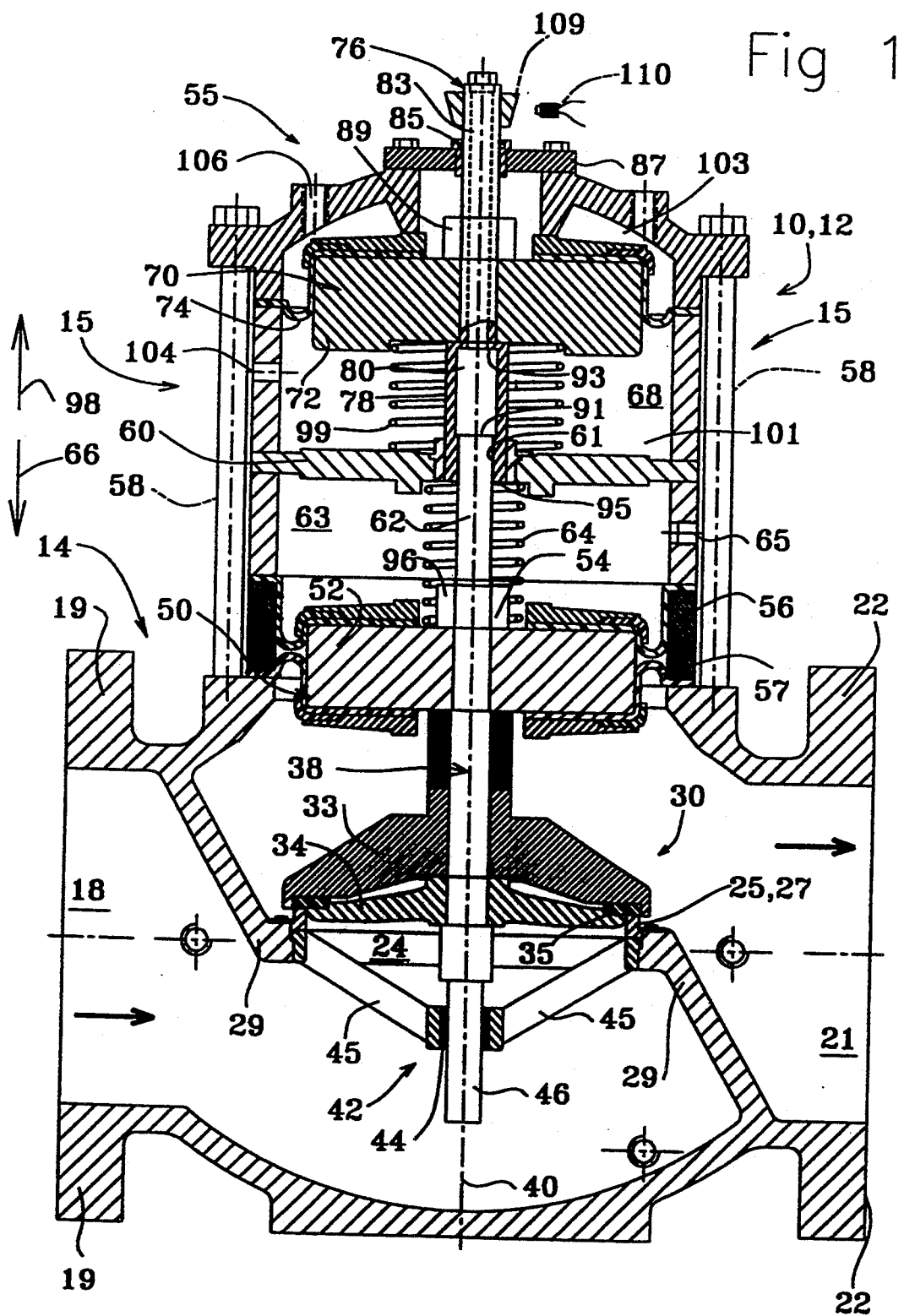
FIG. 1 is a simplified longitudinal section through a central longitudinal plane of an automatic control valve according to the invention, showing the valve closed, and with a back-up system shown in a retracted position.

DETAILED DESCRIPTION
FIG. 1

An automatic control valve 10 according to the invention comprises a valve body 12 having a main globe portion 14 and a hollow cylinder portion 15. The main portion 14 is usually a casting having an inlet port 18 surrounded by an inlet mounting flange 19, and an outlet port 21 surrounded by similar outlet port mounting flange 22. The main portion 14 also includes an annular valve seat 25 which comprises a seat ring 27 secured to seat supports 29 in a conventional manner. The valve seat 25 defines a main valve opening 24 to permit communication between the ports 18 and 21.

Figure 2:
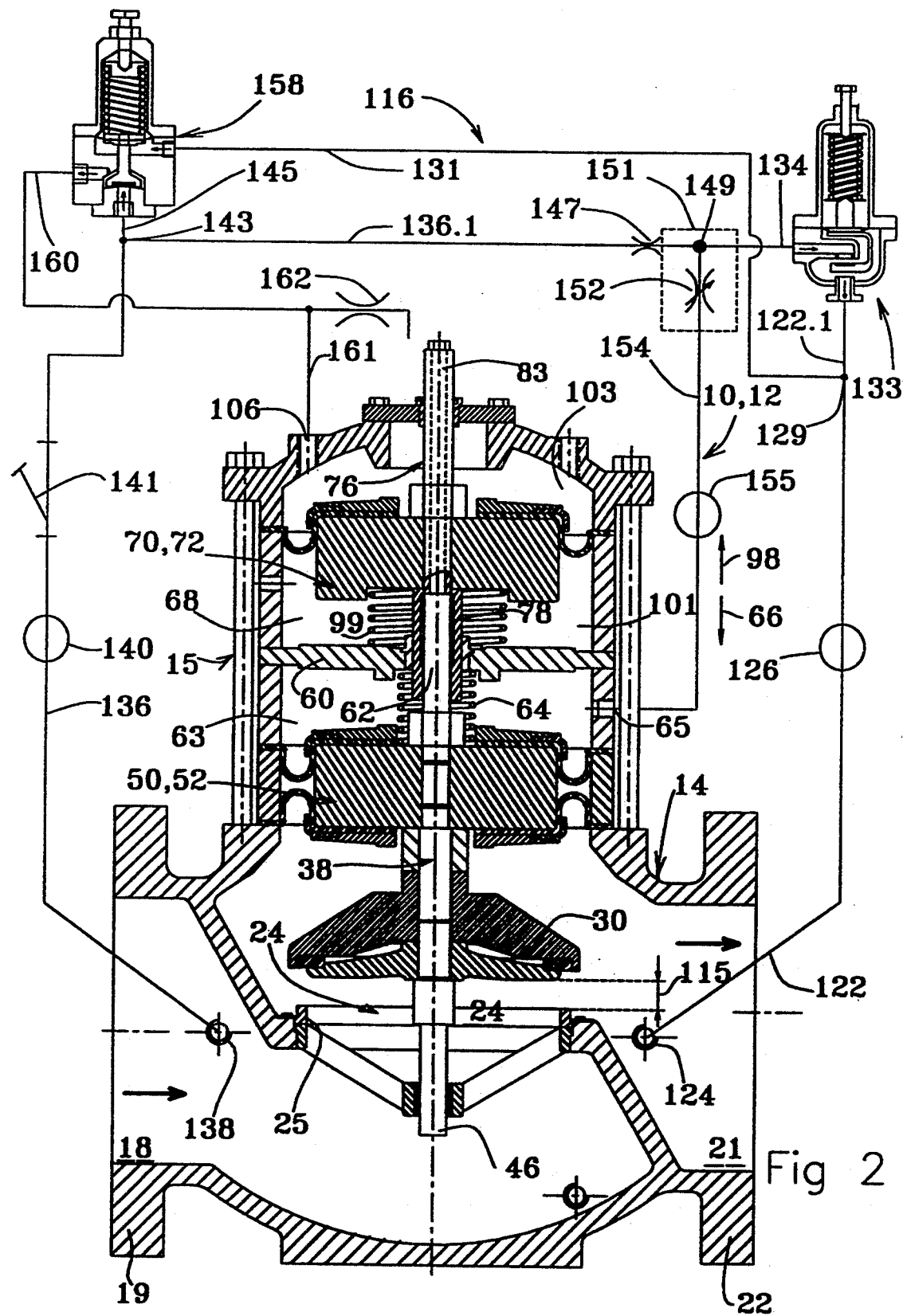
FIG. 2 is a view generally similar to FIG. 1 but at reduced scale, showing the valve partially open, and with the back-up system in operation, the valve also being shown with a dual pilot control system which is shown schematically cooperating with ports of the valve.

The valve 10 also includes a main valve member 30 which is moveable axially between a closed position against the seat 25 to close the valve, as shown in FIG. 1, and an open position spaced from the seat to control flow of liquid through the valve, as seen in FIG. 2. The main valve member follows conventional practice and comprises an outer valve member 33, an inner valve member 34 and a sealing ring 35 retained between the members 33 and 34. The members 33 and 34 are mounted on a main valve rod or valve stem 38 which extends co-axially with a main valve axis 40. A main valve guide 42 comprises a valve guide 44 mounted on a spider 45 extending from adjacent the seat 25 so as to enclose a lower portion 46 of the valve stem 38. Cooperation between the portion 46 and the valve guide 44 assists in maintaining axial motion of the lower portion of the stem 38 as the main valve member 30 moves along the axis 40 between retracted and extended positions of the valve member as the main valve opens and closes respectively.

The valve 10 further includes a first rolling diaphragm assembly 50 comprising a piston 52 mounted on the stem 38 and rigidly secured to the stem adjacent the main valve member 30 by a nut 54. The stem 38 has a plurality of undesignated O-rings to seal the piston and main valve member thereto, to prevent seepage of liquid along the valve stem as is well known. The rolling diaphragm assembly includes inner and outer flexible impermeable fabric-reinforced diaphragms 56 and 57 extending between the piston 52 and the cylinder portion 15, the diaphragms having sufficient "fullness" to provides respective annular folds extending around the piston and the cylinder to seal a circumferential gap therebetween. The folds (which are designated 56 and 57 in FIG. 1) permit fully sealed and low friction movement of the piston along the main valve axis 40 within the cylinder portion 15 with negligible stretching of the diaphragm apart from that occurring in the fold. The cylinder portion 15 is generally complementary to the piston to receive the piston, and comprises a plurality of undesignated, stacked annular portions, and a bonnet or end cap 55 essentially closing the end of the cylinder. Peripheries of the diaphragms 56 and 57 are sandwiched and sealed between adjacent annular portions and the main globe portion 14 as shown. The portion 15 and the end cap 55 are secured to the main portion 14 by a plurality of longitudinally extending bolts 58. In some prior art valves, a resilient means, such as a compression coil spring, can be fitted to assist in closing the valve, and such structure is provided in the present invention, as will be described.

The description above describes major portions of a conventional automatic control valve in which area of the piston is greater than area of the valve seat. The area difference between the piston and valve seat permits use of liquid pressure in the pipe controlled by the valve to generate control pressure signals which act on the valve member to close the valve, eliminating other power sources as is well known. In this type of prior art valve, flow through the valve acts upwardly on the valve member 30 and the generated control pressure signals act downwardly on the valve member in opposition to the upward pressure. When modulation of flow through the valve is under control, a balance between the two forces is attained to position the valve member as required. In addition, in a conventional automatic valve, an upper portion 62 of the valve stem would normally be guided in a guide in a valve bonnet which caps the cylinder to define in part a single control chamber between the bonnet and the piston 52. As previously described, after many reciprocations of the piston in the prior art valve, both of the diaphragms can eventually crack and fail by leaking liquid from the control chamber, causing loss of control of the valve.

In the present invention, the cylinder portion 15 is provided with a bulkhead 60 which extends completely across the cylinder portion and, with the piston 52 and an inner portion of the cylinder portion 15, defines a first control chamber 63. The upper portion 62 of the stem extends from the piston 52 and passes through a central bulkhead opening 61 in the bulkhead. A compression coil spring 64 encircles the upper portion 62 and is fitted between the bulkhead 60 and the piston 52, and applies a light downward force to the piston 52 in direction of an arrow 66 tending to close the valve as shown. As is well known, the force from the spring 64 is relatively light and is used to initiate valve sealing movement by urging the valve member in the direction of the arrow 66 to close the valve, and may be unnecessary in some applications. The cylinder portion 15 has a first control port 65 which provides access to the first control chamber 63 and receives a conduit to provide control pressure signals, as will be described with reference to FIG. 2.

It can be seen that the portion of the valve including the bulkhead 60 resembles, at least functionally, a conventional control valve and the piston 52 is movable within the cylinder with respect to the bulkhead to vary volume of the first control chamber. As the piston 52 is rigidly coupled to the main valve member 30, axial movement of the piston is reflected by the main valve member and results in opening and closing of the valve by an amount dependent on size of the control chamber 63 i.e. pressure differential across the piston. Thus, the first rolling diaphragm assembly 50 provides a first partition means which is moveable between extended and retracted positions thereof to reflect two extreme positions of the main valve member, although the valve member and piston can be located in any intermediate position between the two extremes. The first partition means cooperates with the valve member to transfer movement therebetween, and also cooperates with the cylinder portion 15 and the bulkhead 60 to define the variable volume first control chamber 63. Similarly to other valves, a flat diaphragm or piston with sliding resilient seals could be substituted for the rolling diaphragm assembly 50, thus providing alternative first partition means.

The bulkhead 60 divides the cylinder portion 15 into two main portions, namely the control chamber 63 on one side of the bulkhead 60 and a back-up chamber 68 on an opposite side of the bulkhead 60 remote from the control chamber 63. The back-up chamber 68 contains a second rolling diaphragm assembly 70 having a second piston 72 and a rolling diaphragm 74 sealed and secured to the piston and to the cylinder portion 15. Similarly to the diaphragms 56 and 57, the diaphragm 74 has an annular fold to permit movement of the piston 72 within the back-up chamber 68 along the axis 40. As before, an alternate flat diaphragm or piston with sliding resilient seals can be substituted for the rolling diaphragm assembly 70, thus serving as a second partition means.

The piston 72 is mounted on a back-up rod 76 which has a hollow inner portion 78 which serves as a projection extending towards the bulkhead 60 and having a central axial opening 80 which has a diameter to receive the upper portion 62 of the stem 38. The axial opening 80 has a size to receive the upper portion 62 as a smooth sliding fit therein, and the portion 78 has an outside diameter to pass as a smooth sliding fit through undesignated seals surrounding the opening 61 of the bulkhead 60. Breather grooves and openings can be provided in the portions 62 or 78 to prevent a hydraulic lock forming between the upper portion 62 and the portion 78. The back-up rod 76 also has an outer portion 83 which passes through central sealed opening 85 in an outer end plate 87 which is a portion of the bonnet or end cap 55 of the valve. A nut 89 secures the second piston 72 against a shoulder of the inner portion 78 of the back-up rod 76, thus mounting the piston 72 for movement concurrently with the back-up rod 76. It can be seen that inner portion 78 of the back-up rod 76 is guided for axial movement by the upper portion 62 of the valve stem 38 and the opening 61 of the bulkhead 60, and the outer portion 83 of the rod 76 is guided by the opening 85. It can be seen that cooperation between the opening 85 and the outer portion 83 provides a second diaphragm guide means for guiding the second diaphragm assembly 70 along the main valve axis 40 on a side of the second diaphragm assembly remote from the first diaphragm assembly.

The hollow inner portion 78 and the upper portion 62 of the stem 38 have relative lengths such that, when an annular face 95 of the inner portion 78 contacts an upper face 96 of the nut 54, a circular end face 91 of the portion 62 is clear of an inner face 93 of the inner portion 78. Consequently, location of the upper face 96 of the nut 54 is critical, and there is a close control of this component as it can be required to withstand some considerable force from the end face 95. The faces 95 and 96 could be termed complementary contact portions. It can be seen that the hollow inner portion 78 serves as a coupler extending from the second partition means, and the upper portion 62 of the stem serves as a coupler engaging means extending from a second side of the first partition means opposite to a first side thereof adjacent the valve member. The hollow inner portion 78 is a projection having a hollow open end portion having a size complementary to the upper portion 62 to receive the portion 62 as a sliding fit therein. The bulkhead 60 has the axially aligned sealed opening 61 to receive an outer portion of the projection as a sliding fit therein to serve as a guiding means for adjacent portions of the first and second diaphragm assemblies. The coupler engaging means and the partition opening provide additional alignment, guiding and stability for the coupler of the second piston 72 as it moves to be coupled to the main valve member 30. Many alternative structures are available to couple the piston 72 to the main valve member 50 to serve as second partition coupling means, and to guide the piston 72 to serve as partition guiding means, as will be described.

A compression coil spring 99 extends between the bulkhead 60 and the second piston 72 to apply a relatively light resilient force to the piston in direction of an arrow 98. The spring has sufficient strength to support weight of the piston 72 and associated structure to hold the piston 72 and back-up rod 76 in a retracted or inactive position as shown in FIG. 1 for purposes to be described. The spring 99 is a second resilient means for resiliently urging the second partition means to the retracted position thereof.

The second rolling diaphragm assembly 70 divides the back-up cylinder 68 into a vent chamber 101 on a first side of the diaphragm, and a second control chamber 103 on an opposite second side of the diaphragm. Thus, the space between the second partition means and a portion of the back-up chamber having the bonnet 55 provides the second control chamber 103, and a second control port 106 passes through the end cap 55 to provide access to the second control chamber. The cylinder portion 15 has a vent port 104 admitting atmospheric pressure into the vent chamber 101. The rolling diaphragm assembly 70, serving as the second partition means, is moveable between the inactive position as shown in FIG. 1, and the active position as shown in FIG. 2, and cooperates with the valve body to define in part the variable volume second control chamber 103. Clearly, the second partition means is located on a second side of the first partition means which is remote from the main valve member.

Complementary portions 109 and 110 of an optional electrical position sensor can be provided adjacent the outer end of the back-up rod 76 and on the end plate 87 respectively to indicate when the rod 76 moves from the retracted position. The sensor can be electrically connected to a remote monitoring station to warn the operator that there has been a failure of the primary system, and that the back-up system has taken over operation of the valve.

FIG. 2

The automatic control valve 10 is shown in a control circuit 116 which is designed to maintain a desired flow condition through the valve by varying spacing 115 between the main valve member 30 and the seat 25 in response to pilot control signals. It is well known to modulate flow through a valve using pilot control signals generated at specific locations in a liquid circuit, and the following description provides one means of coupling the automatic valve according to the invention into a pilot control circuit to accommodate failure of the first partition means. With duplicated pilot control systems failure of a pilot circuit associated with the first partition means can also be accommodated. In the following description, normal operation of the control valve will be first described, and this resembles prior art valve operation. This will be followed by response of the invention to failure of a rolling diaphragm associated with the first rolling diaphragm assembly 50. Under normal circumstances in a prior art valve, such failure would have resulted in uncontrolled upward movement of the main valve member 30 and the assembly 50 in direction of the arrow 98. This would normally have resulted in uncontrollable increased flow through the valve, with corresponding problems elsewhere in the liquid circuit controlled by the valve. However, as will be described with reference to FIG. 2, any initially uncontrolled upward movement of the main valve member 30 is quickly controlled by the second rolling diaphragm assembly 70 which moves downwardly in direction of the arrow 66 until contact is made between the end faces 95 and 96 of the portion 78, and the nut 54 respectively.

A first portion of the control circuit 116 comprises a downstream pilot conduit 122 which has an input port 124 penetrating an outlet portion of the valve body 12 downstream from the seat 25. The conduit 122 passes through a manual isolating valve 126 which is normally maintained open, and is closed for servicing purposes only. The conduit 122 passes a junction 129 with a back-up conduit 131, and extends as a conduit 122.1 to a normally open first pilot valve 133. The valve 133 is a modulating pilot valve that responds directly to pressure in the conduit 122.1 and is normally open under low pressure, and progressively closes when exposed to an increasing pressure above a threshold pressure in the conduit 122.1 as will be described, thus controlling flow in a first pilot conduit 134.

A second portion of the control circuit 116 comprises an upstream pilot conduit 136 which extends from an input port 138 located in an inlet portion of the valve body 12 upstream from the valve seat 25. The upstream pilot conduit passes through a manual isolating valve 140, generally similar to the valve 126, through a strainer 141 and to a junction 143 with a delivery line 145. The conduit 136 continues as a conduit 136.1 to a first fixed restrictor 147 which feeds a reduced volume flow to a junction 149 with the first pilot connecting conduit 134, the junction being located in a control zone 151. The volume flow through the fully opened valve 133 is several times greater, i.e. four to five times greater, than flow through the restrictor 147. The junction 149 also communicates with an optional variable flow restrictor 152 which is located in the control zone in a first control signal conduit 154, which connects through a manual isolating valve 155 with the first control port 65 communicating with the first control chamber 63. In normal operation of the apparatus, if the variable restrictor 152 is installed, flow therethrough is adjusted in the field to reduce hunting of the valve.

The back-up conduit 131 extends from the junction 129 to a normally closed second pilot valve 158 so as to control actuation of the second pilot valve 158, which in turn controls flow through the delivery conduit 145. The valve 158 is normally closed when exposed to a relatively low pressure in the back-up conduit 131, i.e. pressure below a threshold or pre-set pressure, and progressively opens when exposed to an increasing pressure above a sufficiently high pressure in the back-up conduit, i.e. a pressure which is above the pre-set pressure, and reflects pressure in the upstream conduit 122 as will be described. Thus, the pilot valve 158 is also a modulating valve and controls flow through a second pilot connecting conduit 160 which feeds into a second control signal conduit 161, which in turn feeds into the second control port 106. A second fixed restrictor 162 communicates with the conduit 160 and is vented to atmosphere. The volume flow through the fully opened pilot valve 158 is several times greater, i.e. between five and ten times greater, than flow through the restrictor 162.

OPERATION

The following description assumes that the diaphragms 56 and 57 associated with the first rolling diaphragm assembly are functioning correctly i.e. the invention is under normal operation. When operating normally, relatively minor deviations of flow through the valve from a desired flow condition are acceptable i.e. they are within pre-set upper and lower flow limits or thresholds. The flow of liquid through the valve opening 24 is modulated by the main valve member 30 spaced at the varying spacing 115 from the valve seat as determined by pressure in the control chamber 63. Pressure of flow downstream from the valve is lower than pressure of flow upstream from the valve, which results in a pressure signal in the downstream pilot conduit 122 being lower than a corresponding pressure signal in the upstream pilot conduit 136.

At the junction 149 in the control zone 151, pressure in the pilot valve connecting conduit 134 is balanced against pressure passing from the upstream pilot conduit 136.1 through the fixed restrictor 147. The fixed restrictor 147 passes a relatively small volume flow compared with maximum flow that can be passed through the fully open first pilot valve 133. Thus, the junction 149 is exposed to a restricted flow of liquid at upstream pressure through the conduit 136.1, the upstream pressure being higher than the pressure in the pilot valve conduit 134 which is controlled by the valve 133 which in turn is responsive to pressure in the conduit 122.1. Combining restricted high pressure from the conduit 136.1 with the lower pressure from the conduit 134 results in a processed pressure signal which passes through the variable restrictor 152 into the conduit 154 which feeds into the control port 65, so as to vary pressure in the control chamber 63 which in turn will vary restriction of the valve opening 24 to maintain a desired flow condition through the valve. The restrictors 147 and 152 and the valves 133 serve as a portion of a pilot signal processing means as will be described.

In the normal mode, downstream pilot pressure in the conduits 122 and 131 never exceeds the threshold pressure required to open the second pilot valve 158, and thus only the first control chamber 63 is functional, and the second control chamber 103 is essentially unpressurized as it is exposed to atmosphere through the restrictor 162. When the valve 10 is operating within normal limits, some deviations of pressure signals from the desired flow condition are acceptable, and typically are within a range or tolerance of ±1 PSI (6.9 kPa) from a mean or nominal desired flow condition.

If pressure at the inlet port 18 is suddenly increased, the valve member 30 is then spaced too far from the seat 25 so that flow through the valve opening 24 becomes somewhat excessive. This causes downstream pressure at the input port 124 to be moderately higher than the preset value, but yet still within the acceptable deviation. The pilot valve 133 is thus exposed to a somewhat higher pressure in the conduit 122, which partially closes the valve 133. This reduces flow through the valve 133 which allows the flow through the restrictor 147 to raise pressure at the junction 149 closer to the pressure in the conduit 136.1. The higher pressure at the junction 149 is transmitted through the restrictor 152 and the conduit 154 into the port 65, so as to increase pressure in the control chamber 63. This results in the corresponding downward movement of the main valve member 30 towards the seat in direction of the arrow 66. This downward movement further throttles the liquid flow through the main valve opening 24, with a corresponding reduction in the pressure at the input port 124 of the downstream conduit. Reducing pressure of the input port 124 causes a corresponding reduction in the pilot pressure in the conduit 122, which eventually limits further closure of the valve 133 stabilizing pressure at the junction 149 through to the control chamber 63, thus preventing further downward movement of the valve member. Clearly, a new balance is reached, although the valve member 30 may move back and forth slightly at a frequency dependent on response of the valve.

Similarly, if the inlet pressure at the port 138 decreases, there is a decreased flow through the valve opening 24 which causes the outlet pressure at the port 124 to drop. This outlet pressure drop causes the pilot valve 133 to open further, thus increasing outward flow through the pilot valve into the conduit 122.1. This results in a drop in pressure in the conduits 134 and 154, with a corresponding reduction in pressure in the first control chamber 63. This permits the main valve member 30 to move upwardly in direction of the arrow 98 due to liquid forces acting on the main valve member 30, which increases flow through the valve opening 24 and correspondingly increases pressure at the input port 124 to regain the desired flow rate through the valve. This is similar to normal operation of a conventional automatic control valve.

From the above, it can be seen that the first control chamber 63 is exposed to a first control pressure which reflects the liquid flow condition through the valve, the control pressure acting on the first partition means to move the partition means as required. The first partition means cooperates with the valve member so that the valve member moves in response to changes in the first control pressure to attempt to position the valve member to maintain the desired liquid flow condition through the valve. Thus, it can be seen that the pilot signal processing means, that is at least the fixed restrictor 147 adjacent the zone 151, and the pilot valves 133 and 158, has a threshold level detector i.e. the valve 158, which is inoperative during normal operation of the valve 10 when the pilot signals reflect an acceptable deviation from a normal desired flow condition.

The following description is of abnormal operation which follows failure of a diaphragm, in particular the diaphragm 56. This type of failure causes leakage of liquid from, and loss of pressure in, the first control chamber 63, causing the main valve member 30 to initially move upwardly in direction of the arrow 98. This upwards movement increases flow through the valve opening 24, which in turn increases downstream or outlet pressure at the input port 124 which eventually reaches an upper threshold pressure which reflects an unacceptable deviation of flow through the valve from the desired flow rate. This causes an increase in pilot pressure in the downstream pilot conduit 122 to exceed a pre-set maximum which starts to close the pilot valve 133, thus reducing loss of pressure therethrough. The increasing pressure in the conduit 122 is also transferred along the back-up conduit 131 to the pilot valve 158, and when a pre-set value is exceeded in the conduit 131, the pilot valve 158 starts to open. This causes liquid in the upstream pilot conduit 136 to pass through the delivery conduit 145, and through the valve 158 into the conduits 160 and 161 and into the second control port 106 of the second control chamber 103. Flow through the restrictor 162 is relatively small, and has a negligible effect on the final pressure signal in the control port 106 which is sufficiently high to overcome force from the spring 99, and results in downward movement of the second rolling diaphragm assembly 70 in direction of the arrow 66. The downward movement continues until the complementary contact portions or faces 96 and 95 of the nut 54 and hollow inner portion 78 respectively contact each other. Eventually and a final position of the assembly 70 is determined by a balance between an upward force on the valve member 30 due to flow through the main valve, and a downward force on the piston 72 due to the second control pressure in the chamber 103. Force from the compression springs 64 and 99 is relatively small, and has little effect on the final position of the valve member.

In general, the first opening of the valve 158 due to rise in an excessive pressure in the pilot conduit 122 can be relatively accurately controlled by pre-setting the threshold level or lower limit of undesirable flow conditions through the valve to be about 5 psi (34.5 kPa) above the nominal or mean normal pressure in the conduit 122. The difference in pressure between pressure of the mean or nominal flow in the normal operation, and the upper threshold pressure which triggers operation of the valve 158 is termed a backup pressure differential which in this instance is about 5 psi (34.5 kPa). In view of the previously described ±1 psi tolerance or deviation from the nominal range, this results in a minimum difference in operating pressure between the uppermost acceptable deviation of flow under normal operation, and the nominal back-up threshold pressure of about 4 psi (27.6 kPa). When in normal operation, only the first chamber is actuated because pressure in the conduit 131 is a minimum of 5 psi below the threshold pressure necessary to open the valve 158. However, when pressure in the conduits 122 and 131 rises above the lower threshold limit, which rise is usually only attained due to failure of a critical portion of the system, the valve 158 starts to open, causing pressurizing of the second control chamber 103. For many purposes, the previously stated minimum difference of 4 psi (27.6 kPa) between operation of the valve using the first control chamber 63, and operation of the valve using the second control chamber 103 is acceptable but other limits can be established. Clearly, adjustment of response to the system is attained by normal procedures, e.g. by selecting and adjusting flow rates through the flow restrictors and setting opening or closing pressures of the pilot valves, is also accomplished following normal procedures. Apart from a slightly higher pressure operating range, there is essentially no difference in operation of the valve when using the first or second control chambers. This contrasts with prior art safety devices known to the inventors in which operation of the valve after failure is usually adversely effected, usually by complete closure of the valve.

Operational characteristics of the valve 10 when operating under control of the pilot valve 158 can be arranged to be generally similar to those when operating under the pilot valve 2.33, except that the valve 10 will have higher threshold levels at the pilot input ports 124 and 138. Thus, the desired flow conditions for abnormal operation, that is when the valve 10 is operating under control of the pilot valve 158 pressurizing the back-up system, will be at a somewhat higher pressure than for normal operation under control of the pilot valve 133. Thus, the threshold level detector, primarily the valve 158, becomes operative when pilot signals reflect an unacceptable deviation from the desired flow condition under normal operation, and effectively raises the normal level of acceptable deviations of flow through the valve to a higher level which provides new acceptable but abnormal flow conditions, while maintaining a similar range of acceptable deviation from the higher abnormal level of desired flow conditions.

It can be seen that the second partition means is retained in a retracted position when deviations of the liquid flow conditions through the valve are acceptable and the second control chamber 103 is only exposed to a second control pressure when there is a failure resulting in unacceptable deviation of liquid flow through the valve from the desired liquid flow condition. Also, the hollow inner portion 78 serves as a second partition coupling means for selectively coupling the second partition means with the valve member should the deviation of the flow conditions through the valve become unacceptable, which increases the second control pressure which becomes sufficiently high to position the main valve member in response to the second control pressure. It can be seen that the second partition coupling means i.e. the hollow inner portion 78, has a length sufficient to permit the second partition coupling means to selectively cooperate with the valve member when the second partition means moves from the inactive position thereof to enable the second partition means to selectively control position of the main valve member as required. The portion 78 thus serves as a coupler extending along the main valve axis from one of the partition means, and the upper portion 62 serves as a coupler engaging means extending from the other partition means. The coupler engaging means is complementary to the coupler so that the coupler and coupler engaging means also assist in guiding the first and second partition means for movement along the main valve axis.

ALTERNATIVES

The above description relates to an automatic valve having a pair axially moveable partition means which are selectively connectable in series with the main valve member, the partition means being located within respective co-axial variable volume control chambers. As previously stated, while rolling diaphragms are shown as the partition means it is well known to use flat diaphragms, or sliding resilient seal pistons, and consequently the benefits of the invention can still be attained using alternative flat diaphragms or sliding seal pistons. The term "partition means" is used to include all types of moveable essentially impermeable partitions which provide a variable volume control chamber on one side of the partition means which is also connected to the valve stem.

The second partition coupling means is shown as a projection extending from one of the partition means to cooperate with the remaining partition means when the second partition means moves sufficiently from the inactive position. In one alternative, if the portion 62 was made relatively longer than the portion 78, the end face 91 could be made to contact the face 93, with a corresponding clearance between the faces 95 and 96. In another alternative, the hollow portion could extend from the first partition means to cooperate with a solid rod extending from the second partition means as an inverse of that illustrated. Other alternative second partition coupling means can be devised, e.g. a single projection extending from one of the partition means and without additional guide means can be substituted for the two portions which provide some redundancy. Irrespective of the type of coupling means selected, it is advantageous to provide with the coupling means first and second partition guide means for guiding the first and second partition means along the main valve axis as disclosed. In this embodiment a first partition guide means cooperates with the first partition means on a second side thereof remote from the valve member. Clearly, in addition both the first and second control chambers require adequate sealing around any stem or rod passing therethrough.

It can be seen that the valve 10 of the present invention differs from other known automatic control valves primarily by providing the back-up cylinder 68 with the second partition means, i.e. the assembly 70, and the second partition coupling means, i.e. the portions 62 and 78, which selectively couple the second partition means to the main valve member for actuation upon failure of the first partition means. These main components, and a few ancillary components such as the bulkhead 60 and cylinder body portions etc. can be easily manufactured and adapted to be installed as a retro-fit kit to a compatible automatic control valve, thus providing operators with the advantages of the invention without completely replacing costly automatic control valves already installed.

Also, the control circuit 116 is disclosed having first and second pilot conduits exposed to liquid pressure on opposite sides of the valve to generate first and second pilot signals respectively. In alternative applications, a first pilot conduit could be exposed to liquid pressure on one side of the valve to generate a first pilot signal, and a second pilot could be located elsewhere in the circuit, e.g. in a tank or reservoir to generate a second pilot signal, or vice versa. Location of the pilot conduits follows conventional practice, and is dependent on the many and varied application of the valve. In all instances, the invention provides a pilot signal processing means, for example, flow restrictors and pilot valves, to process the signal in the pilot conduits prior to admitting the signal into the appropriate control chamber. The pilot signal processing means has an output which represents a first control signal when the output reflects an acceptable deviation from desired flow conditions. However, when the piston seals or diaphragms fail, or other structure associated with the first control chamber fails, the output from the signal processing represents a second output signal which reflects an unacceptable deviation from desired flow conditions and the back-up circuit becomes operative.

If redundant pilot circuits and associated pilot valves are also included to provide separate independent back-up control signal conduits communicating with the control chambers in addition to the previously described primary circuit, failure of the pilot system in the primary conduit could also be accommodated by the present invention. As previously stated, i.e. some prior art control systems may have a back-up pilot system to protect against primary pilot system failure, such prior art back-up pilot systems do not protect against diaphragm failure of the main valve, and thus do not provide all the advantages of the present invention.

It can be seen that a method according to the invention is for automatically controlling liquid flow through the valve and comprises a first step of detecting an acceptable first flow signal through the valve and generating a first control signal to reflect an acceptable deviation from a desired flow condition through the valve. The valve member is then displaced in response to the first control signal by varying pressure in the first control chamber, the valve member being displaced by the first partition means with respect to the valve seat in a direction to attempt to maintain the desired flow condition. Upon failure of the primary control circuit, an unacceptable second flow condition through the valve is detected, which in turn generates a second control signal to reflect an unacceptable deviation from the desired flow condition. This results in displacing the valve member in response to the second control signal by varying pressure in the second control chamber, the valve member being displaced by the second partition means with respect to the valve seat in a direction to attempt to maintain the desired flow condition.

What is claimed is:

1. An automatic control valve comprising:
   (a) a valve body having an inlet port, an outlet port, and a valve seat disposed between the ports, the valve seat defining a valve opening to permit communication between the ports,
   (b) a main valve member moveable between a closed position against the seat to close the valve, and an open position spaced from the seat to control flow of liquid through the valve opening to maintain a desired flow condition through the valve,
   (c) a first partition means moveable between extended and retracted positions thereof to reflect the two positions of the main valve member, the first partition means cooperating with the valve body to define in part a variable volume first control chamber, the first control chamber being exposed to a first control pressure which reflects the liquid flow condition through the valve, the control pressure acting on the first partition means to move the first partition means, the first partition means cooperating with the valve member so that the valve member moves in response to changes in the first control pressure to attempt to position the valve member to maintain the desired liquid flow condition through the valve,
   (d) a second partition means being moveable between inactive and active positions thereof, the second partition means cooperating with the valve body to define in part a variable volume second control chamber, the second control chamber being exposed to a second control pressure which reflects an unacceptable deviation of liquid flow through the valve from the desired flow condition, the second partition means being retained in the retracted position thereof when deviations of the liquid flow conditions through the valve are acceptable, and
   (e) second partition coupling means for selectively coupling the second partition means with the valve member should the deviation of the flow conditions through the valve become unacceptable, which increases the second control pressure to become sufficiently high to position the valve member in response to the second control pressure.
2. A valve as claimed in claim 1 in which:

(a) the main valve member is moveable along a main valve axis between the extended and retracted positions thereof.

3. A valve as claimed in claim 2 in which:
(a) the first partition means is moveable along the main valve axis,
(b) the first partition means is connected to the main valve member on a first side of the first partition means to move the valve member with the first partition means, and
(c) the second partition is located on a second side of the first partition means which is remote from the valve member.

4. A valve as claimed in claim 2 in which:
(a) the second partition means is moveable along the main valve axis, and
(b) the second partition coupling means has a length sufficient to permit the second partition means to selectively cooperate with the valve member when the second partition means moves from the inactive position thereof to enable the second partition means to selectively control position of the main valve member as required.

5. A valve as claimed in claim 4 in which:
(a) the first partition means is moveable along the main valve axis,
(b) the second partition coupling means is a projection extending from one of the partition means to cooperate with the remaining partition means when the second partition means moves sufficiently from the inactive position.

6. A valve as claimed in claim 2 in which:
(a) the valve body includes a hollow cylinder to receive the first partition means,
(b) a bulkhead extends across the hollow cylinder to define, in combination with the first partition means and a portion of the cylinder, the first control chamber, and
(c) the first partition means is moveable within the hollow cylinder and with respect to the bulkhead so as to vary volume of the first control chamber.

7. A valve as claimed in claim 6 in which:
(a) the valve body has an end portion to close an end of the hollow cylinder remote from the valve seat, the end portion being spaced from the bulkhead to provide a back-up chamber within a remainder of the hollow cylinder,
(b) the second partition means is mounted for movement in the back-up chamber, and a space between the second partition means and a portion of the back-up chamber defines the second control chamber.

8. A valve as claimed in claim 7 in which:
(a) the main valve axis passes centrally through the cylinder,
(b) the first partition means is rigidly connected to the main valve member on a first side of the first partition means, and the valve further comprises:
(c) valve guide means for guiding the main valve member for movement along the main valve axis, the valve guide means cooperating with the valve member on a side of the valve member remote from the first partition means,
(d) first partition guide means for guiding the first partition means along the main valve axis, the first partition guide means cooperating with the first partition means on a second side thereof remote from the valve member,
(e) second partition guide means for guiding the second partition means along the main valve axis, the second partition guide means cooperating with the second partition means on a side thereof remote from the first partition means;

and the second partition coupling means comprises:
(f) a coupler rod extending along the main valve axis from one of the partition means, and
(g) a coupler engaging means extending from the other partition means, the coupler engaging means being complementary to the coupler so that the coupler and the coupler engaging means also assist in guiding the first and second partition means for movement along the main valve axis.

9. A valve as claimed in claim 8 in which:
(a) the coupler engaging extends from a second side of the first partition means opposite to the first side thereof,
(b) the coupler extends from the second partition means and is a projection having a hollow open end portion having a size complementary to the coupler to receive the coupler as a sliding fit therein, and
(c) the bulkhead has an axially aligned opening to receive a portion of the projection as a sliding fit therein to serve as partition guide means.

10. A valve as claimed in claim 1 further comprising:
(a) first resilient means for resiliently urging the first partition member in a direction to close the main valve.

11. A valve as claimed in claim 1 further comprising:
(a) a second resilient means for resiliently urging the second partition means to the retracted position thereof.

12. A valve as claimed in claim 6 further comprising:
(a) a second resilient means for resiliently urging the second partition means to the retracted position thereof, the second resilient means extending between the bulkhead and the second partition means.

13. A valve as claimed in claim 1 further comprising
(a) first and second pilot conduits exposed to liquid pressure at two separate locations to generate first and second pilot signals respectively,
(b) a pilot signal processing means for processing the first and second pilot signals, the pilot signal processing means having an output which represents the first control signal when the output reflects an acceptable deviation from desired flow conditions, or alternatively, the output reflects a second control signal when the output signal reflects an unacceptable deviation from desired flow conditions.

14. A valve as claimed in claim 13 in which:
(a) the signal processing means has a threshold level detector which is inoperative during normal operation of the valve when the pilot signals reflect an acceptable deviation from a normal desired flow condition,
(b) the threshold level detector becomes operative when the pilot signals reflect an unacceptable deviation from the desired flow conditions under normal operations, and effectively raises the normal level of acceptable deviations of flow through the valve to an abnormal level of acceptable flow conditions, while maintaining a similar range of acceptable deviations from the abnormal level of desired flow conditions.

15. A valve as claimed in claim 14 in which:

(a) the threshold level detector is a pilot valve exposed to at least one pilot signal, the valve having a threshold level above which it becomes operative to control supply of pressurized liquid to the second control chamber.

16. A valve as claimed in claim 13 in which:

(a) the first and second pilot conduits have respective input ports located on opposite sides of the valve, so that the pilot conduits generate first and second pilot signals based on conditions on opposite sides of the valve.

17. A method of automatically controlling liquid flow through a valve, the method comprising the steps of:

(a) detecting an acceptable first flow condition through the valve and generating a first control signal to reflect an acceptable deviation from a desired flow condition through the valve, (b) displacing a main valve member in response to the first control signal by varying pressure in a first control chamber, the main valve member being displaced by a first partition means with respect to a valve seat in a direction to attempt to maintain the desired flow condition, (c) detecting an unacceptable second flow condition through the valve and generating a second control signal to reflect an unacceptable deviation from the desired flow condition, and (d) displacing the main valve member in response to the second control signal by varying pressure in a second control chamber, the main valve member being displaced by a second partition means with respect to the valve seat in a direction to attempt to maintain the desired flow condition.

18. A method as claimed in claim 17 further characterised by:

(a) maintaining pressure in the second control chamber below an operating pressure until the unacceptable deviation in the desired flow condition is attained, and (b) transmitting liquid into the second control chamber at a pressure sufficient to displace the second partition means to displace the main valve member.

19. A method as claimed in claim 18 further characterised by:

(a) maintaining a partition means of the second control chamber in a retracted position remote from the valve member until the unacceptable deviation in the desired flow condition is attained.

20. A method as claimed in claim 18 further characterized by:

(a) when an unacceptable deviation in the desired flow condition is attained, exposing a threshold level detector to a signal to initiate operation of the threshold level detector, to generate the second control signal, which signal is fed to the second control chamber.

* * * * *